United States Patent
Hoelzle et al.

(10) Patent No.: US 9,451,427 B1
(45) Date of Patent: Sep. 20, 2016

(54) DELIVERY NOTIFICATION ENHANCEMENT FOR DATA MESSAGES

(71) Applicant: Sprint Communications Company L.P., Overland Park, KS (US)

(72) Inventors: Sean Patrick Hoelzle, Collegeville, PA (US); Thomas Keith Terwilliger, Jr., Martinsburg, WV (US); George Laurence Dohanich, Cary, NC (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/329,375

(22) Filed: Jul. 11, 2014

(51) Int. Cl.
*H04W 4/00* (2009.01)
*H04W 4/14* (2009.01)

(52) U.S. Cl.
CPC ...................... *H04W 4/14* (2013.01)

(58) Field of Classification Search
CPC ..... H04W 4/466; H04W 4/14; H04M 15/00; H04Q 7/20
USPC ............. 455/466; 370/466; 715/753; 379/11, 379/112, 113, 88.12, 88.25; 707/10
See application file for complete search history.

(56) References Cited

U.S. PATENT DOCUMENTS

| | | | | |
|---|---|---|---|---|
| 5,774,532 A * | 6/1998 | Gottlieb | ................ | H04M 15/00 379/112.01 |
| 7,027,567 B1 * | 4/2006 | Scott | ................ | H04M 3/53366 379/88.12 |
| 2006/0123013 A1 * | 6/2006 | Ryu | ................ | G06T 3/4092 |
| 2006/0168532 A1 * | 7/2006 | Stevens | ................ | G06Q 10/06 715/753 |
| 2008/0046918 A1 * | 2/2008 | Carmi | ................ | H04N 21/812 725/32 |
| 2008/0076457 A1 * | 3/2008 | Kim | ................ | H04W 4/12 455/466 |
| 2010/0153505 A1 * | 6/2010 | Oh et al. | ................ | 709/206 |
| 2014/0134978 A1 * | 5/2014 | Zitnik et al. | ................ | 455/411 |
| 2014/0243028 A1 * | 8/2014 | Colombo et al. | ................ | 455/466 |

FOREIGN PATENT DOCUMENTS

| CN | 102123133 | | 7/2011 |
|---|---|---|---|
| CN | 102123133 A | * | 7/2011 |

* cited by examiner

*Primary Examiner* — Kashif Siddiqui
*Assistant Examiner* — Farid Seyedvosoghi (57) ABSTRACT

The message server system receives a data message transferred by a sending communication system for delivery to a receiving communication system. The data message has a first messaging format with disposition notification codes. The messaging server system converts the data message from the first messaging format to a second messaging format and transfers the data message for delivery to a receiving communication system over a particular communication network. The messaging server system processes the disposition notification codes and responsively transfers a disposition notification for delivery to the sending communication system, indicating that the data message was converted from the first messaging format into the second messaging format, and was transferred over the particular communication network for delivery to the receiving communication system.

18 Claims, 8 Drawing Sheets

DELIVERY NOTIFICATION ENHANCEMENT FOR DATA MESSAGES

TECHNICAL BACKGROUND

Short Message Service (SMS) is a text messaging service component of phone, Web, or mobile communication systems. It uses standardized communications protocols to allow fixed line or mobile phone devices to exchange short text messages. SMS offers delivery reports, but not delivery notification indicating that a message was actually read by the intended recipient. A SMS delivery report only indicates that the SMS message has been successfully delivered to SMS message center defined by the network, but not necessarily to the intended recipient.

Multimedia Messaging Service (MMS) is a standard way to send messages that include multimedia content to and from mobile phones. It extends the core SMS capability that allowed exchange of text messages only up to 160 characters in length. MMS is capable of providing delivery reports and read receipts. However, they do not work on all networks.

Rich Communications Services, also known as Rich Communications Suite (RCS), is a platform that enables the delivery of content beyond voice and SMS, providing consumers with instant messaging or chat, live video and file sharing across devices and across networks.

Open Mobile Alliance (OMA) Converged IP Messaging (CPM) defines a framework that provides the convergence of multi-media communication services built on top of a SIP/IP core infrastructure, while leveraging standardized service functionalities from existing communication enablers. This framework comprises a set of functional components and interfaces that have been designed to facilitate easy deployment of existing and future communication services.

SMS interoperability enables operators (regardless of network technologies and geographic regions) to offer their subscribers the ability to easily send and receive SMS messages to friends, family and colleagues who are on a different operator's network. SMS interoperability commonly refers to the SMS interworking service that provides the connection and routing of SMS messages between two operator networks. Some properties of the message, such as formatting, may change during the interworking service and there is no way for the sender to know if the intended recipient received and displayed the message as originally transmitted.

Currently, RCS 5.1 and OMA CPM standalone messaging has features to provide delivery and read disposition notifications via SIP Message Method to inform an RCS originating device that the message has been delivered or read (also referred to as "displayed"). There are provisions in the OMA CPM specification that detail interworking between MMS delivery and read reports and RCS disposition notifications, but there is nothing in the existing standards that allows an RCS CPM platform to communicate to the originating device that the message was interworked to SMS or MMS.

Overview

The message server system receives a data message transferred by a sending communication system for delivery to a receiving communication system. The data message has a first messaging format with disposition notification codes. The messaging server system converts the data message from the first messaging format to a second messaging format and transfers the data message for delivery to a receiving communication system over a particular communication network. The messaging server system processes the disposition notification codes and responsively transfers a disposition notification for delivery to the sending communication system, indicating that the data message was converted from the first messaging format into the second messaging format, and was transferred over the particular communication network for delivery to the receiving communication system.

DETAILED DESCRIPTION

Figure 1:
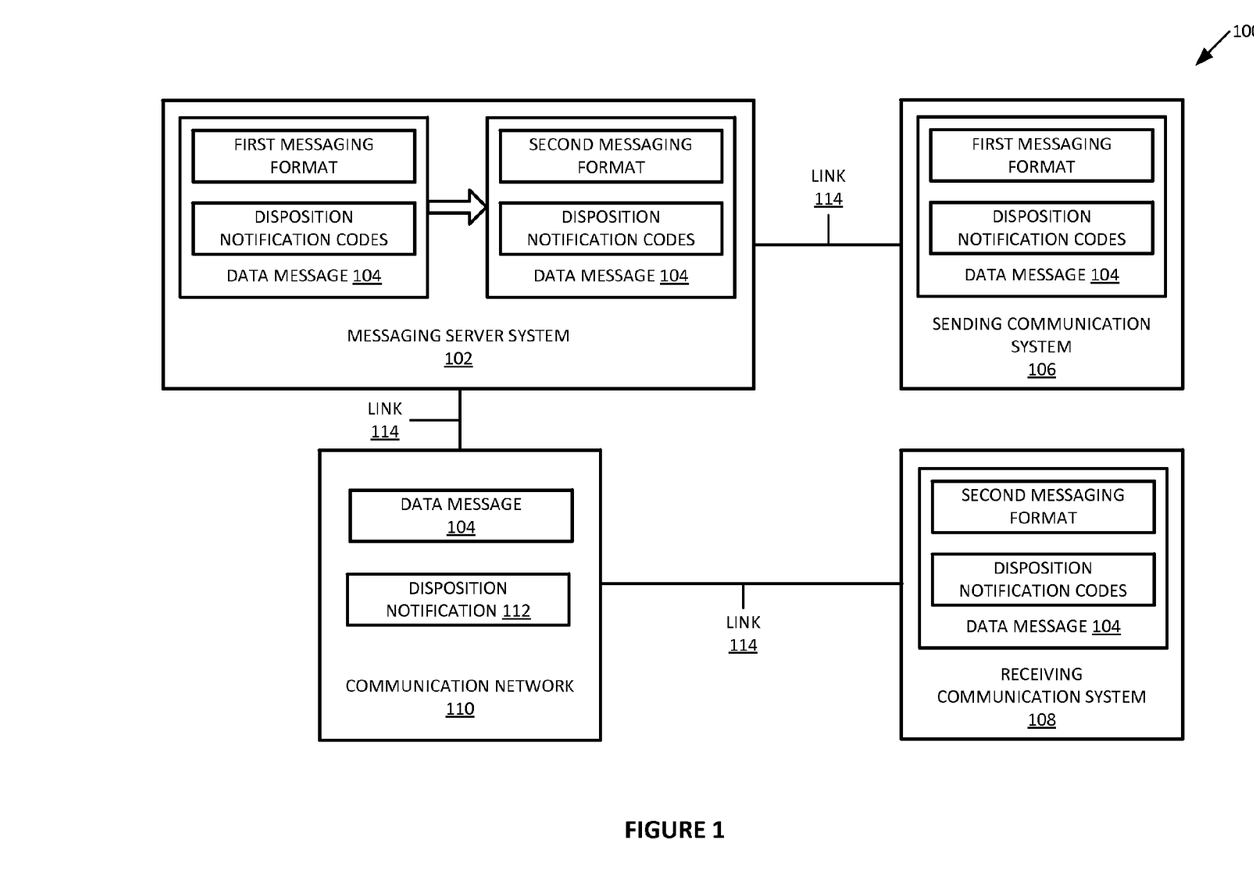
FIGS. 1-3 illustrate a data messaging system for delivery notification enhancement for data messages.

FIG. 1 illustrates a data messaging system 100 for delivery notification enhancement for data messages. Data messaging system 100 comprises messaging server system 102, sending communication system 106, receiving communication system 108, communication network 110 and link 114.

Messaging server system 102 is configured to receive data message 104 from sending communication system 106 for delivery to receiving communication system 108. Data message 104 comprises a message format and disposition notification codes. Message format comprises Short Message Service (SMS), Multimedia Message Service (MMS), Enhanced Message Service (EMS), Rich Communication Services (RCS), or other data messaging formats including combinations thereof. Disposition notification codes are coded requests set by the user of sending communication system 106 when data message 104 is created indicating the data that the user would like to receive from disposition notice 112. For example, a disposition notification code might indicate that data message 104 was delivered to messaging server system 102, that data message 104 was displayed on receiving communication device 108, that delivery of data message 104 failed or some other indicia of status including combinations thereof. Messaging server system 102 is configured to convert data message 104 from a first messaging format to a second messaging format. Messaging server system 102 transfers data message 104 for delivery to receiving communication system 108 over communication network 110. Additionally, messaging server system 102 processes disposition notification codes and responsively transfers disposition notification 112 for delivery to sending communication system 106. Disposition notification 112 includes information regarding data message 104 such as message format, format conversions, image display resolution, display time, display screen size, delivery networks and other information regarding the delivery and display of data message 104. Disposition notification 112 is sometimes referred to as a read receipt, return receipt, or delivery notification, though other terms may be used. Disposition notification 112 indicates that data message 104 was converted from the first messaging format to the second messaging format and was transferred over communication network 110 for delivery to receiving communication system 108.

Sending communication system 106 is configured to send and receive data message 104 and disposition notification 112. Sending communication system 106 comprises computer and communication circuitry, data memory, and associated software/hardware components. Sending communication system 106 can be a telephone, computer, media player, gaming apparatus, internet appliance, or some other machine capable interfacing with messaging server system 102. Likewise, receiving communication system 108 comprises computer and communication circuitry, data memory, and associated software/hardware components. Receiving communication system 108 may be a telephone, computer, media player, gaming apparatus, internet appliance, or some other machine capable interfacing with messaging server system 102.

Communication network 110 is configured to transfer data message 104 and disposition notification 112. Communication network 110 comprises eNodeBs, wireless access points, gateways, control systems, routers, servers, communication links, other wireless networks, the Public Switched Telephone Network (PSTN), and IP networks, such as the Internet, or other external networks or devices and/or other network elements including combinations thereof. Link 114 comprises metal, glass, plastic, air, space, and the like. Link 114 in some examples propagates electromagnetic signals that utilize various protocols, such as LTE, Internet Protocol (IP), Ethernet, Session Initiation Protocol (SIP), Diameter, Real-time Transfer Protocol (RTP), and/or some other format—including combinations thereof. Link 114 may include intermediate devices, systems, and networks.

Figure 2:
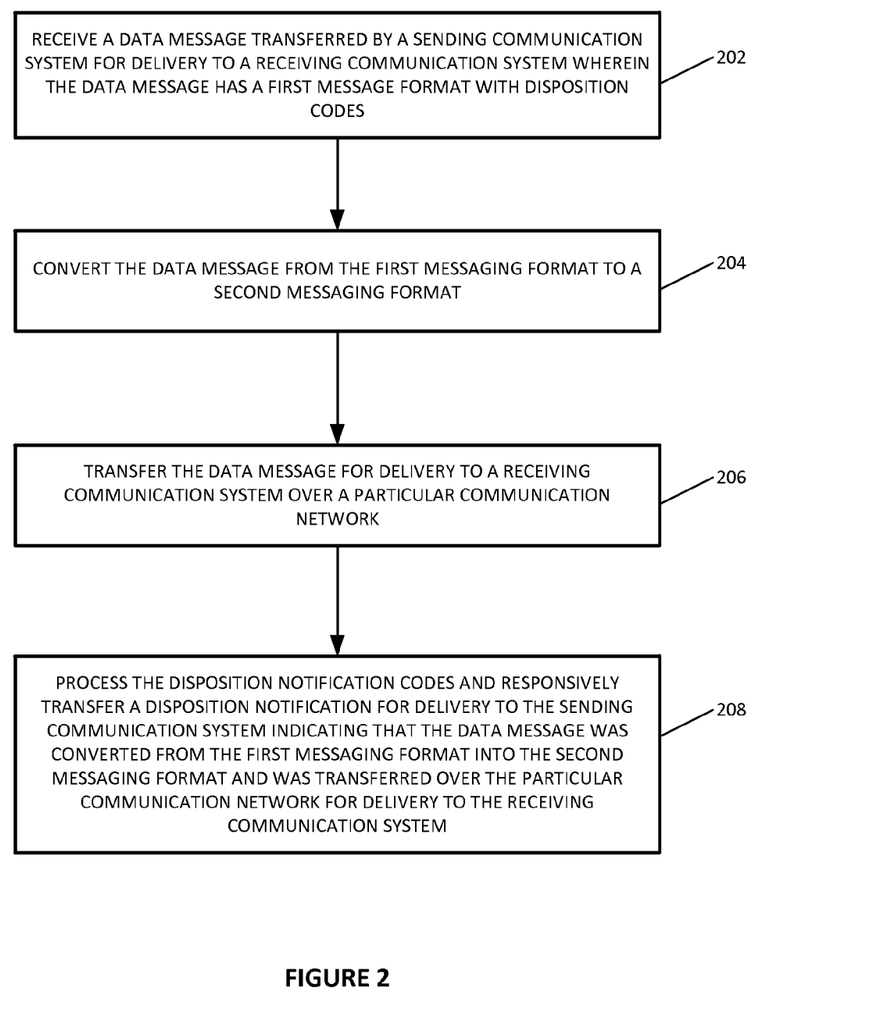

FIG. 2 illustrates the operation of data messaging system 100 for delivery notification enhancement for data messages. Messaging server system 102 receives data message 104 transferred by sending communication system 106 for delivery to receiving communication system 108 (202). Data message 104 includes a first message format and disposition codes. Messaging server system 102 converts data message 104 from the first message format to a second message format (204). Message server system 102 transfers data message 104 for delivery to receiving communication system 108 over communication network 110 (206). Messaging server system 102 processes disposition notification codes and responsively transfers disposition notification 112 for delivery to sending communication system 106 indicating that data message 104 was converted from the first messaging format to the second messaging format and was transferred over communication network 110 for delivery to receiving communication system 108 (208).

Figure 3:
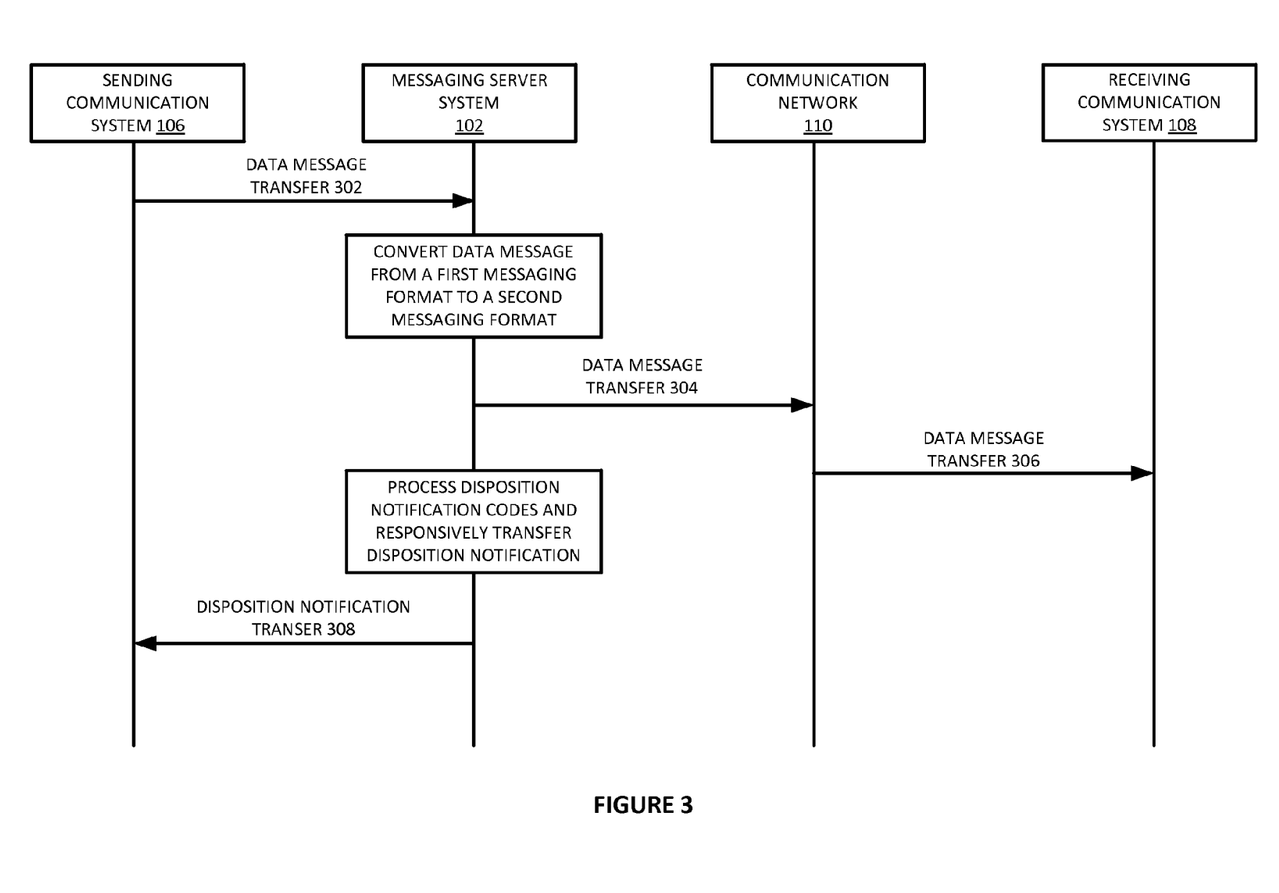

FIG. 3 illustrates the operation of data messaging system 100 for delivery notification enhancement for data messages. Sending communication system 106 transfers data message 104 to messaging server system 102 (302). Messaging server system 102 converts data message 104 from a first messaging format to a second messaging format. Messaging server system 102 transfers data message 104 to communication network 110 (304). Communication network 110 transfers data message 104 to receiving communication system 108 (306). Messaging server system 102 processes disposition notification codes and responsively transfers disposition notification 112 for delivery to sending communication system 106 indicating that data message 104 was converted from the first messaging format to the second messaging format and was transferred over communication network 110 for delivery to receiving communication system 108 (308).

Figure 4:
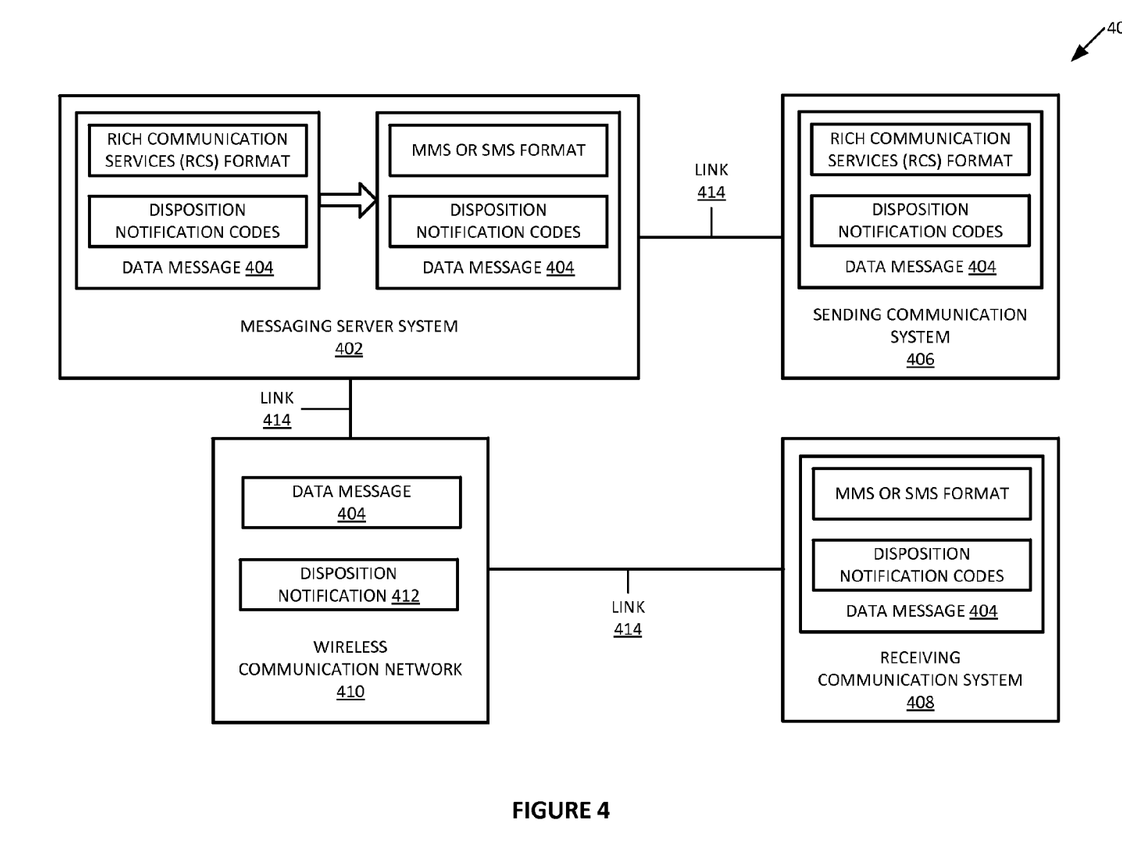
FIGS. 4-6 illustrate a data messaging system for delivery notification enhancement for data messages that have been interworked.

FIG. 4 illustrates data messaging system 400 for delivery notification enhancement for data messages. Data messaging system 400 provides an example of data messaging system 100, although data messaging system 100 may have alternative configurations and operations. Data messaging system 400 comprises messaging server system 402, sending communication system 406, receiving communication system 408, wireless communication network 410 and link 414.

Messaging server system 402 is configured to receive data message 404 from sending communication system 406 for delivery to receiving communication system 408. Data message 404 comprises a message format and disposition notification codes. Message format comprises Short Message Service (SMS), Multimedia Message Service (MMS), Enhanced Message Service (EMS), Rich Communication Services (RCS), or other data messaging formats including combinations thereof. Disposition notification codes are coded requests set by the user of sending communication system 406 when data message 404 is created indicating the data that the user would like to receive from disposition notice 412.

Disposition notification 412 includes information regarding data message 404 such as message format, format conversions, image display resolution, display time, display screen size, delivery networks and other information regarding the delivery and display of data message 404. Disposition notification 412 is sometimes referred to as a read receipt, return receipt, or delivery notification, though other terms may be used. For example, a disposition notification code might indicate that data message 404 was delivered to messaging server system 402, that data message 404 was displayed on receiving communication device 408, that delivery of data message 404 failed or some other indicia of status including combinations thereof.

Display information including image resolution and display size may be of particular importance to a user sending data message 404. For example, a user sending data message 404 may be interested in knowing whether or not data message 404 was displayed by receiving communication system 408 at the original image resolution or screen size. A realtor trying to sell a house or engineers working on a project might be very interested in knowing if the receiving party viewed data message 404 as originally intended, because the important part of the communication may be the resolution and display size of the image. To continue the example, a user records high-definition video and transfers the video in data message 404 to receiving communication device 408, but data message 404 was interworked during the transfer causing the high-definition video sent by sending communication system 406 to be displayed at receiving communication system 408 in low-resolution. Disposition notification codes indicate to sending communication system 406 that the high-definition video was interworked to low-resolution when displayed by receiving communication system 408. Additionally, receiving communication system 408 may have a smaller display screen size than sending communication system 406 causing quality degradation to data message 404. Disposition notification 412 can relay receiving communication system 408 display information, among other things, back to sending communication system 406.

Messaging server system 402 is configured to convert data message 404 from RCS format to SMS or MMS format. Messaging server system 402 transfers data message 404 for delivery to receiving communication system 408 over wireless communication network 410. Additionally, messaging server system 402 processes disposition notification codes and responsively transfers disposition notification 412 for delivery to sending communication system 406. Disposition notification 412 indicates that the data message was converted from RCS format to either MMS or SMS format and was transferred over wireless communication network 410 for delivery to receiving communication system 408.

Sending communication system 406 is configured to send and receive data message 404 and disposition notification 412. Sending communication system 406 comprises computer and communication circuitry, data memory, and associated software/hardware components. Sending communication system 406 can be a telephone, computer, media player, gaming apparatus, internet appliance, or some other machine capable interfacing with messaging server system 402. Likewise, receiving communication system 408 comprises computer and communication circuitry, data memory, and associated software/hardware components. Receiving communication system 408 can be a telephone, computer, media player, gaming apparatus, internet appliance, or some other machine capable interfacing with messaging server system 402.

Wireless communication network 410 is configured to transfer data message 404 and disposition notification 412. Wireless communication network 410 comprises eNodeBs, wireless access points, gateways, control systems, routers, servers, communication links, other wireless networks, the Public Switched Telephone Network (PSTN), and IP networks, such as the Internet, or other external networks or devices and/or other network elements including combinations thereof. Link 414 comprises metal, glass, plastic, air, space, and the like. Link 414 in some examples propagates electromagnetic signals that utilize various protocols, such as LTE, Internet Protocol (IP), Ethernet, Session Initiation Protocol (SIP), Diameter, Real-time Transfer Protocol (RTP), and/or some other format—including combinations thereof. Link 414 may include intermediate devices, systems, and networks.

Figure 5:
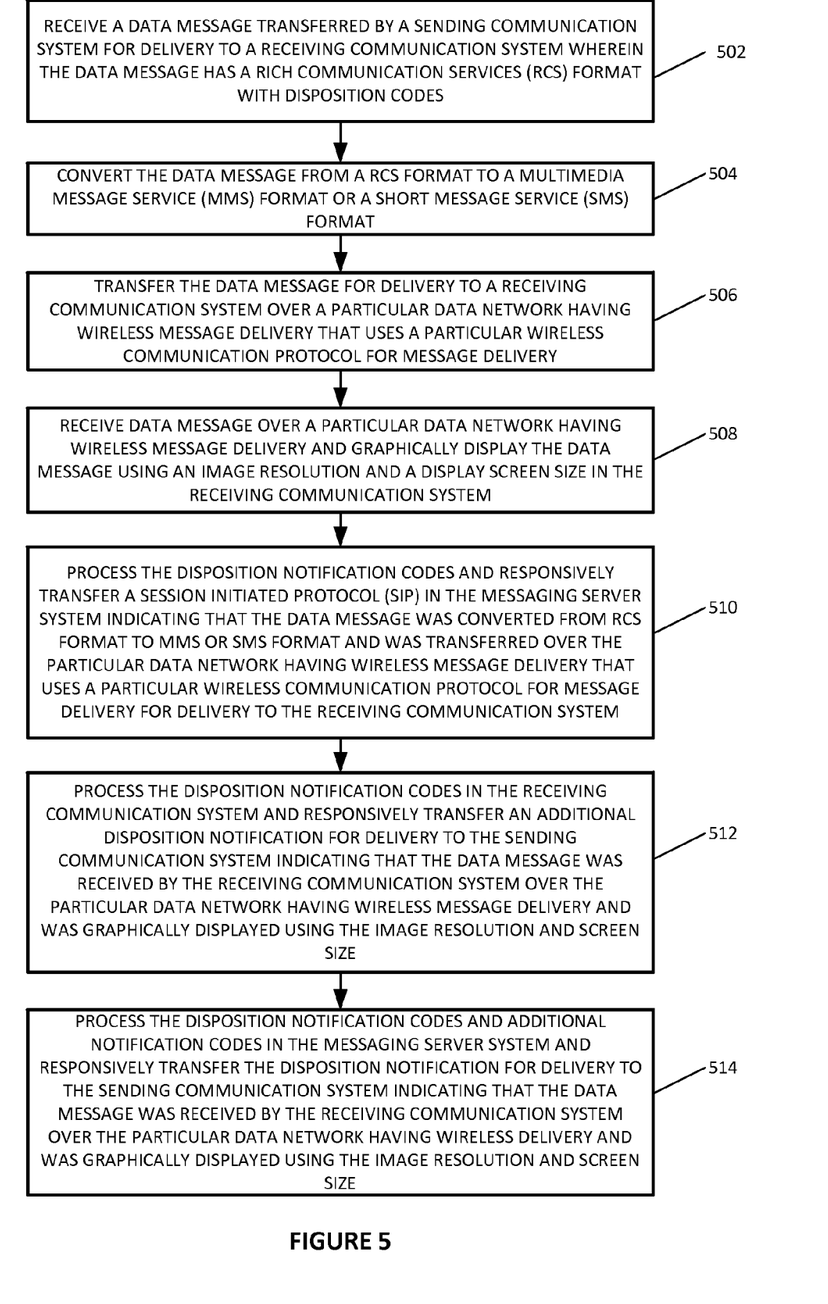

FIG. 5 illustrates the operation of data messaging system 400 for delivery notification enhancement for data messages. Messaging server system 402 receives data message 404 transferred by sending communication system 406 for delivery to receiving communication system 408 wherein data message 404 has a RCS format with disposition codes (502). Messaging server system 402 converts data message 404 from RCS format to MMS or SMS format (504). Message server system 402 then transfers data message 404 for delivery to receiving communication system 408 over wireless communication network 410 that uses a particular wireless communication protocol for message delivery (506). Receiving communication system 408 receives data message 404 over wireless communication network 410 and graphically displays data message 404 using an image resolution and display screen size (508). Messaging server system 402 processes disposition notification codes and responsively transfers a Session Initiation Protocol (SIP) message indicating that data message 404 was converted from RCS format into MMS or SMS format, and was transferred over wireless communication network 410 using a particular wireless communication protocol to receiving communication system 408 (510). Receiving communication system 408 processes disposition notification codes and responsively transfers an additional disposition notification for delivery to sending communication system 406 indicating that data message 404 was received by receiving communication system 408 over wireless communication network 410 and was graphically displayed using the image resolution and screen size (512). Messaging server system 402 processes disposition notification codes and additional notification codes and responsively transfers disposition notification 412 for delivery to sending communication system 406 indicating that data message 404 was received by receiving communication system 408 over wireless communication network 410, and was graphically displayed using the image resolution and screen size (514).

Figure 6:
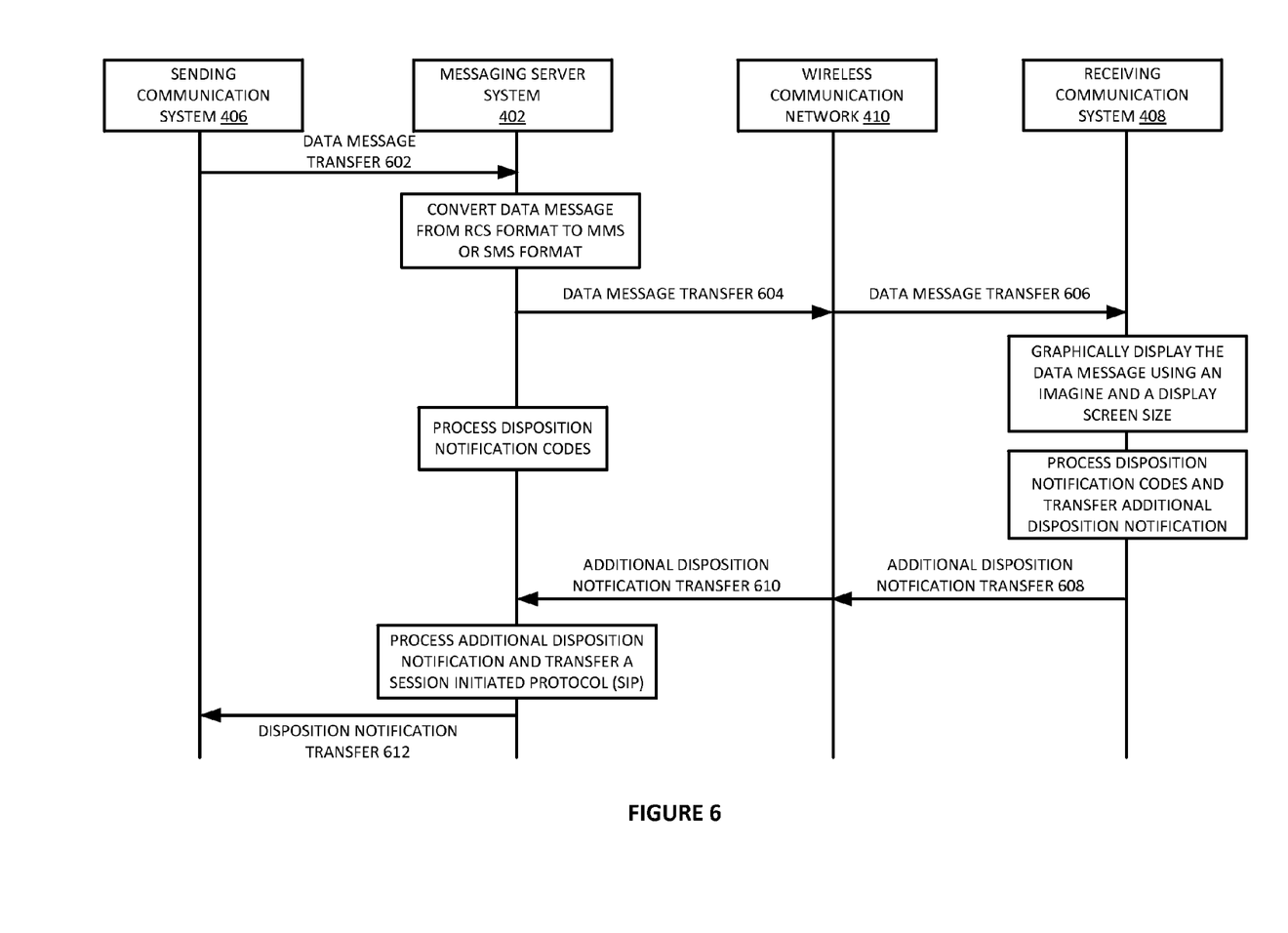

FIG. 6 illustrates the operation of data messaging system 400 for delivery notification enhancement for data messages. Sending communication system 406 sends data message 404 to messaging server system 402 (602). Messaging server system 402 converts data message 404 from RCS format to MMS or SMS format. Messaging server system 402 transfers data message 404 to wireless communication network 410 (604). Wireless communication network 410 transfers data message 404 to receiving communication system 408 (606). Messaging server system 402 processes disposition notification codes. Receiving communication system 408 graphically displays data message 404 using an image size and a display screen size. Receiving communication system 408 processes disposition notification codes and transfers additional disposition notifications 412 (608). Wireless communication network 410 transfers data message 404 to messaging server system 402 (610). Messaging server system 402 processes disposition notification codes and additional disposition notifications 412 and responsively transfers SIP to sending communication system 406 (612).

Figure 7:
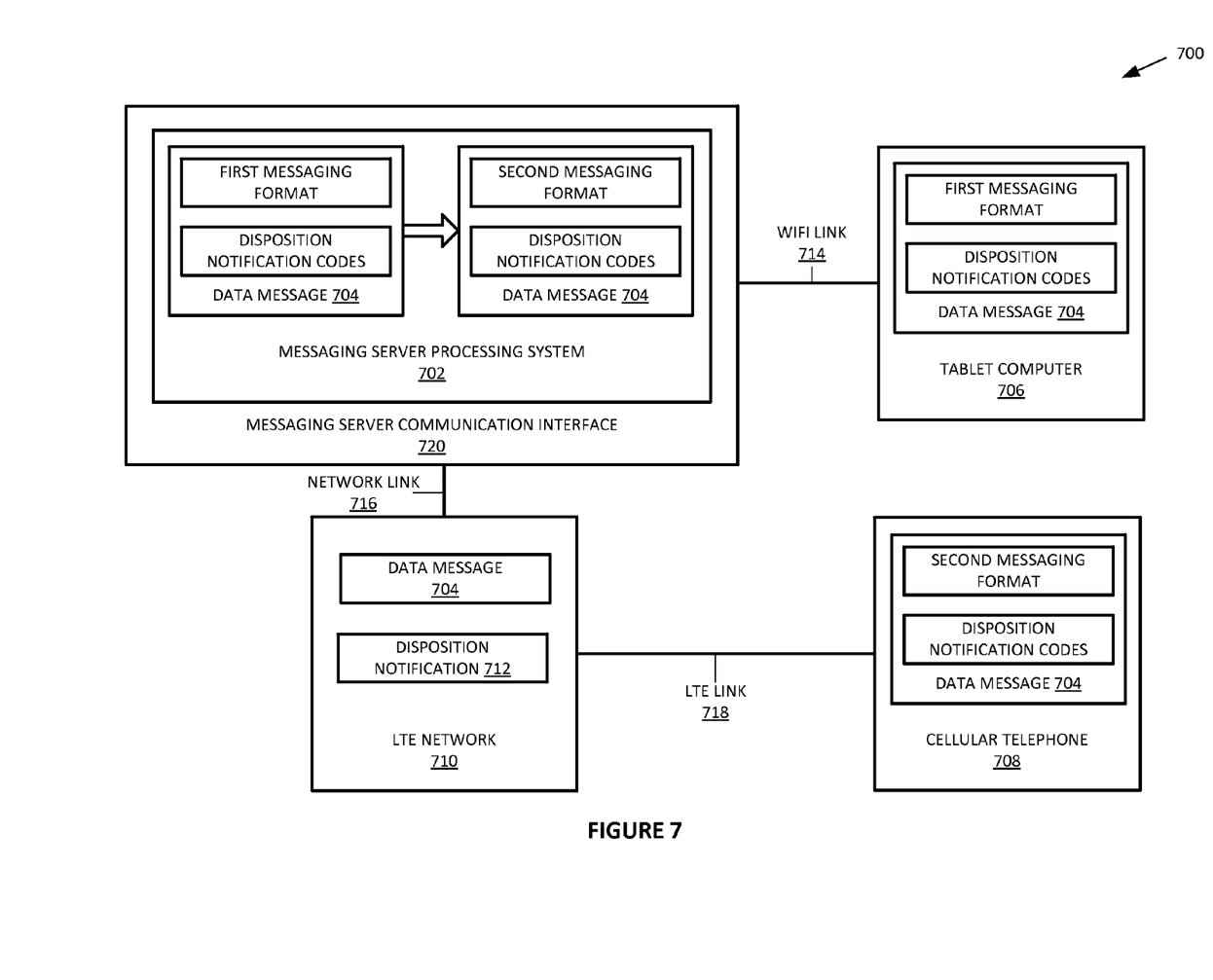
FIG. 7 illustrates a data messaging system comprising a messaging server communication interface for delivery notification enhancement for data messages.

FIG. 7 illustrates data messaging system 700 for delivery notification enhancement for data messages. Data messaging system 700 provides an example of data messaging systems 100 and 400, although data messaging systems 100 and 400 may have alternative configurations and operations. Data messaging system 700 comprises tablet computer 706, cellular telephone 708, LTE network 710, WIFI link 714, network link 716, and LTE link 718, and messaging server communication interface 720.

Tablet computer 706 is configured to send and receive data message 704 and disposition notification 712. Tablet computer 706 comprises computer and communication circuitry, data memory, and associated software/hardware components. Cellular telephone 708 comprises computer and communication circuitry, data memory, and associated software/hardware components.

Messaging server communication interface 720 comprises messaging server processing system 702. Messaging server communication interface 720 is configured to receive data message 704 from tablet computer 706 for delivery to cellular telephone 708. Data message 704 comprises a message format and disposition notification codes. Message format comprises Short Message Service (SMS), Multimedia Message Service (MMS), Enhanced Message Service (EMS), Rich Communication Services (RCS), or other data messaging formats including combinations thereof.

Disposition notification codes are coded requests set by the user of sending communication system 706 when data message 704 is created indicating the data that the user would like to receive from disposition notice 712. Disposition notification 712 includes information regarding data message 704 such as message format, format conversions, image display resolution, display time, display screen size, delivery networks and other information regarding the delivery and display of data message 704. Disposition notification 712 is sometimes referred to as a read receipt, return receipt, or delivery notification, though other terms may be used.

Display information including image resolution and display size may be of particular importance to a user sending data message 704. For example, a user sending data message 704 may be interested in knowing whether or not data message 704 was displayed by receiving communication system 708 at the original image resolution or screen size. To continue the example, a user records high-definition video and transfers the video in data message 704 to receiving communication device 708, but data message 704 was interworked during the transfer causing the high-definition video sent by sending communication system 706 to be displayed at receiving communication system 708 in low-resolution. Disposition notification codes indicate to sending communication system 706 that the high-definition video was interworked to low-resolution when displayed by receiving communication system 708. Additionally, receiving communication system 708 may have a smaller display screen size than sending communication system 706 causing quality degradation to data message 704. Disposition notification 712 may relay receiving communication system 708 display information, among other things, back to sending communication system 706.

Messaging server communication interface 720 is configured to receive data message 704 over WIFI link 714 and to convert data message 704 from a first messaging format to a second messaging format. Messaging server communication interface 720 transfers data message 704 over network link 716 for delivery to cellular telephone 708 over LTE network 710 via LTE network link 718. Additionally, messaging server communication interface 720 processes disposition notification codes and responsively transfers disposition notification 712 for delivery to tablet computer 706. Disposition notification 712 indicates that data message 704 was converted from the first messaging format to the second messaging format and was transferred over LTE network 710 for delivery to cellular telephone 708.

LTE network 710 is configured to wirelessly transfer data message 704 and disposition notification 712. LTE network 710 comprises eNodeBs, wireless access points, gateways, control systems, routers, servers, communication links, other wireless networks, the Public Switched Telephone Network (PSTN), and IP networks, such as the Internet, or other external networks or devices and/or other network elements including combinations thereof. LTE link 718 comprises metal, glass, plastic, air, space, and the like. LTE link 718 in some examples propagates electromagnetic signals that utilize various protocols, such as LTE, Internet Protocol (IP), Ethernet, Session Initiation Protocol (SIP), Diameter, Real-time Transfer Protocol (RTP), and/or some other format—including combinations thereof. LTE link 718 may include intermediate devices, systems, and networks.

Figure 8:
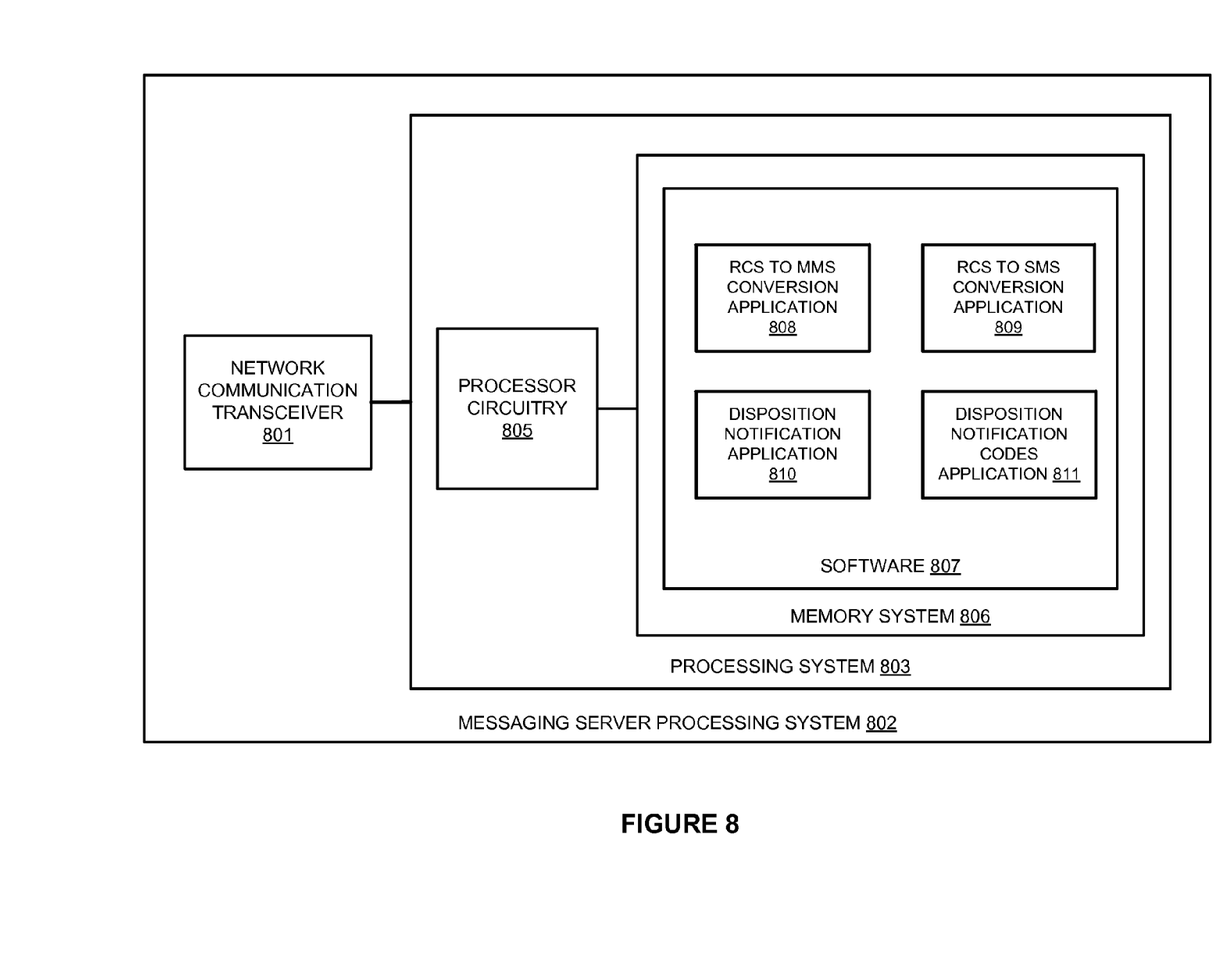
FIG. 8 illustrates a messaging server processing system for delivery notification enhancement for data messages.

FIG. 8 illustrates messaging server processing system 802 for delivery notification enhancement for data messages. Messaging server processing system is an example of messaging server systems 102, 402 and 702, although these systems may use alternative configurations and operations. Messaging server processing system 802 comprises network communication transceiver 801 and processing system 803. Network communication transceiver 801 comprises communication components, such as ports, signal processing circuitry, memory, software, and the like. Messaging server processing system 802 comprises microprocessor and other circuitry that retrieves and executes software 807 from memory system 806. Processor circuitry 805 may comprise a single device or could be distributed across multiple devices—including devices in different geographic areas. Processor circuitry 805 may be embedded in various types of equipment. Memory system 806 comprises a non-transitory computer readable storage medium, such as a disk drive, flash drive, data storage circuitry, or some other hardware memory apparatus. Memory system 806 may comprise a single device or could be distributed across multiple devices—including devices in different geographic areas. Memory system 806 may be embedded in various types of equipment. In some examples, a computer apparatus could comprise memory system 806 and software 807. Software 807 comprises computer programs, firmware, or some other form of machine-readable processing instructions. Software 807 may include an operating system, utilities, drivers, network interfaces, applications, or some other type of software. In this example, software 807 comprises software applications 808-811, although software 807 could have alternative configurations in other examples.

RCS to MMS conversion application 808 directs processing system 803 to operate as described herein when executed by processor circuitry 805. RCS to MMS conversion application 808 directs processing system 803 to convert RCS formatted data messages to MMS formatted data messages.

RCS to SMS conversion application 809 directs processing system 803 to operate as described herein when executed by processor circuitry 805. RCS to SMS conversion application 809 directs processing system 803 to convert RCS formatted data messages to SMS formatted data messages.

Disposition notification application 810 directs processing system 803 to operate as described herein when executed by processor circuitry 805. Disposition notification application 810 directs processing system 803 to process disposition notification codes, generate and transfer disposition notification 712 for delivery to sending communication system 706.

Disposition notification 712 indicates whether data message 704 was received by receiving communication system 708, converted from a first messaging format to a second messaging format, transferred over a particular communication network and/or how data message 704 displayed by receiving communication system 708. For example, Disposition notification 712 might indicate that data message 704 was converted from RCS format to SMS or MMS format, or that data message 704 was transferred over a data network having wireless message delivery using a particular wireless communication protocol for message delivery. Disposition notification application 810 can also transfer a disposition notification 712 by transferring a Session Initiated Protocol (SIP). Disposition notification application 810 can generate disposition notification 712 indicating that data message 704 was graphically displayed in receiving communication system 708 using graphical display characteristics such as image resolution and display size.

Disposition notification codes application 811 directs processing system 803 to operate as described herein when executed by processor circuitry 805. Disposition notification codes application 811 directs processing system 803 to process and transmit disposition notification codes. Disposition notification application 810 communicates with disposition notification codes application 811.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a receiving user communication device to support data messaging, the method comprising:

the receiving user communication device receiving a user data message from a sending user communication device wherein the user data message comprises a media file and a display information request, wherein the display information request comprises a request for display characteristics including at least image resolution information and display size information for the media file when displayed on the receiving user communication device;
the receiving user communication device graphically displaying the media file using an image resolution and a display size; and
responsive to the display information request, the receiving user communication device transferring a display information response for delivery to the sending user communication device that indicates the image resolution and the display size used by the receiving user communication device to display the media file.

2. The method of claim 1 wherein:
the display information request comprises a disposition code for the image resolution;
the receiving user communication device transferring the display information response for delivery to the sending user communication device that indicates the image resolution comprises responsive to the display information request comprises transferring the display information response for delivery to the sending user communication device that indicates the image resolution responsive to the disposition code for the image resolution.

3. The method of claim 1 wherein:
the display information request comprises a disposition code for the display size;
the receiving user communication device transferring the display information response for delivery to the sending user communication device that indicates the display size responsive to the display information request comprises transferring the display information response for delivery to the sending user communication device that indicates the image resolution responsive to the disposition code for the display size.

4. The method of claim 1 wherein:
the receiving user communication device graphically displaying the media file comprises graphically displaying the media file for a display time period; and
the receiving user communication device transferring the display information response comprises transferring the display information response indicating the display time period used by the receiving user communication device to display the media file.

5. The method of claim 4 wherein:
the display information request comprises a disposition code for the display time period;
the receiving user communication device transferring the display information response for delivery to the sending user communication device that indicates the display time period responsive to the display information request comprises transferring the display information response for delivery to the sending user communication device that indicates the display time period responsive to the disposition code for the display time period.

6. The method of claim 1 wherein:
the receiving user communication device receiving the user data message from the sending user communication device comprises the receiving user communication device receiving the user data message over a destination communication network; and
the receiving user communication device transferring the display information response comprises transferring the display information response indicating the destination communication network used by the receiving user communication device to receive the media file.

7. The method of claim 6 wherein:
the display information request comprises a disposition code for the destination communication network;
the receiving user communication device transferring the display information response for delivery to the sending user communication device that indicates the destination communication network responsive to the display information request comprises transferring the display information response for delivery to the sending user communication device that indicates the destination communication network responsive to the disposition code for the destination communication network.

8. The method of claim 1 wherein:
the receiving user communication device graphically displaying the media file comprises graphically displaying the media file using a media format; and
the receiving user communication device transferring the display information response comprises transferring the display information response indicating the media format used by the receiving user communication device to display the media file.

9. The method of claim 8 wherein:
the display information request comprises a disposition code for the media format;
the receiving user communication device transferring the display information response for delivery to the sending user communication device that indicates the media format responsive to the display information request comprises transferring the display information response for delivery to the sending user communication device that indicates the media format responsive to the disposition code for the media format.

10. A receiving user communication device to support data messaging comprising:
a receiving device communication interface configured to receive a user data message from a sending user communication device wherein the user data message comprises a media file and a display information request, wherein the display information request comprises a request for display characteristics including at least image resolution information and display size information for the media file when displayed on the receiving user communication device;
a receiving device processing system configured to graphically display the media file using an image resolution and a display size; and
responsive to the display information request, the receiving device communication interface configured to transfer a display information response for delivery to the sending user communication device that indicates the image resolution and the display size used by the receiving user communication device to display the media file.

11. The receiving user communication device of claim 10 wherein:
the display information request comprises a disposition code for the image resolution;
the receiving device communication interface configured to transfer the display information response for delivery to the sending user communication device that indicates the image resolution comprises responsive to the display information request comprises the receiving device communication interface configured to transfer the display information response for delivery to the sending user communication device that indicates the image resolution responsive to the disposition code for the image resolution.

12. The receiving user communication device of claim 10 wherein:

the display information request comprises a disposition code for the display size;

the receiving device communication interface configured to transfer the display information response for delivery to the sending user communication device that indicates the display size responsive to the display information request comprises the receiving device communication interface configured to transfer the display information response for delivery to the sending user communication device that indicates the image resolution responsive to the disposition code for the display size.

13. The receiving user communication device of claim 10 wherein:

the receiving device processing system is configured to graphically display the media file comprises the receiving device processing system configured to graphically display the media file for a display time period; and the receiving device communication interface configured to transfer the display information response comprises the receiving device communication interface configured to transfer the display information response indicating the display time period used by the receiving user communication device to display the media file.

14. The method of claim 13 wherein:

the display information request comprises a disposition code for the display time period;

the receiving device communication interface configured to transfer the display information response for delivery to the sending user communication device that indicates the display time period responsive to the display information request comprises the receiving device communication interface configured to transfer the display information response for delivery to the sending user communication device that indicates the display time period responsive to the disposition code for the display time period.

15. The receiving user communication device of claim 10 wherein:

the receiving device communication interface configured to receive the user data message from the sending user communication device comprises the receiving device communication interface configured to receive the user data message over a destination communication network; and the receiving device communication interface configured to transfer the display information response comprises the receiving device communication interface configured to transfer the display information response indicating the destination communication network used by the receiving user communication device to receive the media file.

16. The receiving user communication device of claim 15 wherein:

the display information request comprises a disposition code for the destination communication network;

the receiving device communication interface configured to transfer the display information response for delivery to the sending user communication device that indicates the destination communication network responsive to the display information request comprises the receiving device communication interface configured to transfer the display information response for delivery to the sending user communication device that indicates the destination communication network responsive to the disposition code for the destination communication network.

17. The receiving user communication device of claim 10 wherein:

the receiving device data processing system configured to graphically display the media file comprises the receiving device processing system configured to graphically display the media file using a media format; and the receiving device communication interface configured to transfer the display information response comprises the receiving device communication interface configured to transfer the display information response indicating the media format used by the receiving user communication device to display the media file.

18. The receiving user communication device of claim 17 wherein:

the display information request comprises a disposition code for the media format;

the receiving device communication interface configured to transfer the display information response for delivery to the sending user communication device that indicates the media format responsive to the display information request comprises the receiving device communication interface configured to transfer the display information response for delivery to the sending user communication device that indicates the media format responsive to the disposition code for the media format.

* * * * *